(12) United States Patent
Pivovarov

(10) Patent No.: US 10,951,392 B2
(45) Date of Patent: Mar. 16, 2021

(54) FAST FORMAT-PRESERVING ENCRYPTION FOR VARIABLE LENGTH DATA

(71) Applicant: VISA INTERNATIONAL SERVICE ASSOCIATION, San Francisco, CA (US)

(72) Inventor: Eugene Pivovarov, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 139 days.

(21) Appl. No.: 16/014,516

(22) Filed: Jun. 21, 2018

(65) Prior Publication Data

US 2018/0316491 A1 Nov. 1, 2018

Related U.S. Application Data

(63) Continuation of application No. PCT/US2016/012880, filed on Jan. 11, 2016.

(51) Int. Cl.
G06F 21/00 (2013.01)
H04L 9/06 (2006.01)
(Continued)

(52) U.S. Cl.
CPC ............ *H04L 9/0618* (2013.01); *G06F 7/588* (2013.01); *H04L 9/0637* (2013.01);
(Continued)

(58) Field of Classification Search
CPC ... H04L 9/0618; H04L 9/0637; H04L 9/0869; H04L 2209/046; H04L 2209/043; H04L 9/0625; H04L 2209/24; H04L 9/0631; H04L 2209/08; H04L 9/0643; H04L 9/14; H04L 9/065; H04L 9/002; H04L 9/0662; H04L 2209/34; H04L 9/0861;
(Continued)

(56) References Cited

U.S. PATENT DOCUMENTS 6,738,779 B1   5/2004   Shapira
7,711,955 B1   5/2010   Olson
(Continued)

FOREIGN PATENT DOCUMENTS

WO   2011143257   11/2011
WO   2017123199    7/2017

OTHER PUBLICATIONS

Lee et al., Format-Preserving Encryption Algorithms Using Families of Tweakable Blockciphers, 2015, Springer.*
(Continued)

*Primary Examiner* — David Garcia Cervetti
(74) *Attorney, Agent, or Firm* — Kilpatrick Townsend & Stockton LLP

(57) ABSTRACT

Systems, apparatuses, and methods are provided for fast format-preserving encryption. An input string can be divided into blocks (potentially of varying length). An arrangement of cryptographic pipelines can perform operations on different blocks, each pipeline providing an output block. The cryptographic pipelines can interact such that the output blocks are dependent on each other, thereby providing strong encryption. The pipelines can operate efficiently on the block and operations can occur partly in parallel.

20 Claims, 10 Drawing Sheets

(51) Int. Cl.
*G06F 7/58* (2006.01)
*H04L 9/08* (2006.01)
(52) U.S. Cl.
CPC ...... *H04L 9/0869* (2013.01); *H04L 2209/043* (2013.01); *H04L 2209/046* (2013.01)
(58) Field of Classification Search
CPC . H04L 2209/12; H04L 9/0894; H04L 9/0891; H04L 9/008; H04L 2209/04; H04L 9/06; G06F 7/588; G06F 21/602; G06F 21/6209
See application file for complete search history.

(56) References Cited

U.S. PATENT DOCUMENTS

| | | | | |
|---|---|---|---|---|
| 9,325,499 | B1* | 4/2016 | Juels | H04L 9/0861 |
| 9,432,181 | B2* | 8/2016 | Minematsu | H04L 9/0625 |
| 9,635,011 | B1* | 4/2017 | Wu | H04L 9/0861 |
| 9,773,243 | B1* | 9/2017 | Spies | G06Q 20/027 |
| 2005/0180565 | A1* | 8/2005 | Kurdziel | H04L 9/0631 380/42 |
| 2006/0013388 | A1* | 1/2006 | Suen | H04L 9/0625 380/28 |
| 2008/0082834 | A1* | 4/2008 | Mattsson | G06F 12/1408 713/189 |
| 2008/0170693 | A1* | 7/2008 | Spies | G06F 21/6245 380/277 |
| 2009/0060197 | A1* | 3/2009 | Taylor | H04L 9/0618 380/277 |
| 2009/0310778 | A1* | 12/2009 | Mueller | G06Q 20/3823 380/44 |
| 2010/0054461 | A1* | 3/2010 | Ciet | H04L 9/0618 380/29 |
| 2010/0074440 | A1* | 3/2010 | Lee | H04L 9/0631 380/44 |
| 2010/0074441 | A1* | 3/2010 | Pauker | H04L 9/0625 380/45 |
| 2010/0111297 | A1* | 5/2010 | Pauker | H04L 9/0625 380/37 |
| 2010/0111298 | A1* | 5/2010 | Krig | H04L 9/0637 380/37 |
| 2010/0246813 | A1* | 9/2010 | Morris | H04L 9/0656 380/28 |
| 2010/0250965 | A1* | 9/2010 | Olson | G06F 9/3895 713/190 |
| 2011/0103579 | A1* | 5/2011 | Martin | G06F 21/602 380/28 |
| 2011/0213807 | A1 | 9/2011 | Mattsson | |
| 2011/0246315 | A1* | 10/2011 | Spies | G06Q 20/20 705/16 |
| 2011/0280394 | A1* | 11/2011 | Hoover | H04L 9/0625 380/28 |
| 2011/0307383 | A1* | 12/2011 | Ratica | G06Q 20/02 705/44 |
| 2012/0039469 | A1* | 2/2012 | Mueller | G06Q 20/12 380/252 |
| 2012/0143770 | A1* | 6/2012 | Pauker | G06F 21/6263 705/71 |
| 2013/0091028 | A1* | 4/2013 | Oder ("J.D."), II | G06Q 20/3821 705/16 |
| 2013/0168450 | A1* | 7/2013 | von Mueller | H04L 9/0618 235/449 |
| 2013/0198525 | A1* | 8/2013 | Spies | G06F 21/6227 713/189 |
| 2013/0212026 | A1* | 8/2013 | Powell | G06Q 20/3823 705/71 |
| 2013/0339252 | A1* | 12/2013 | Pauker | H04L 9/3226 705/71 |
| 2014/0108813 | A1* | 4/2014 | Pauker | G06F 21/6218 713/189 |
| 2015/0134972 | A1 | 5/2015 | Martin et al. | |
| 2015/0244518 | A1* | 8/2015 | Koo | H04L 9/0631 380/44 |
| 2015/0261499 | A1* | 9/2015 | Condorelli | G06F 5/01 708/204 |
| 2015/0310087 | A1* | 10/2015 | Tidwell | G06F 16/258 713/189 |
| 2015/0341166 | A1* | 11/2015 | Minematsu | H04L 9/0625 380/28 |
| 2015/0349950 | A1* | 12/2015 | Shrimpton | G06F 12/1408 713/189 |
| 2015/0358159 | A1* | 12/2015 | Rozenberg | G09C 1/00 380/28 |
| 2016/0019396 | A1* | 1/2016 | Davis | H04L 63/0807 713/193 |
| 2016/0034442 | A1* | 2/2016 | Levy | H04L 63/0421 709/203 |
| 2016/0056954 | A1* | 2/2016 | Lee | H04L 9/0625 380/28 |
| 2016/0218860 | A1* | 7/2016 | Murray | H04L 9/065 |
| 2016/0269175 | A1* | 9/2016 | Cammarota | H04L 9/002 |
| 2016/0364722 | A1* | 12/2016 | Nair | G06Q 20/3223 |
| 2017/0026170 | A1* | 1/2017 | Farkash | G06F 21/602 |
| 2017/0048059 | A1* | 2/2017 | Murray | H04L 9/065 |
| 2017/0214521 | A1* | 7/2017 | Busch | G06F 21/606 |

OTHER PUBLICATIONS

Jalaj Neelesh Shah, A Comparison of HMAC-based and AES-based FFX mode of Operation for Format-Preserving Encryption, Jul. 2015, Research Gate.*
Bellare et al., The FFX Mode of Operation for Format-Preserving Encryption, Feb. 2010, Voltage, Univ. California, San Diego.*
Mallaiah et al., Performance Analysis of Format Preserving Encryption (FIPS PUBS 74-8) over block ciphers for Numeric data, 2013, IEEE.*
PCT International Search Report and Written Opinion in re PCT/US2016/012880 dated Oct. 4, 2016, 9 pages.
Halevi, et al, "A Tweakable Enciphering Mode", Advances in Cryptology Crypto '03, Lecture Notes in Computer Science, vol. 2729, D. Boneh, ed., Springer-Verlag, 2003, 33 pages.
Black, et al., "Ciphers with Arbitrary Finite Domains", Dept. of Computer Science, University of Nevada, Reno NV 89557, USA, jrb@cs.unr.edu, WWW home page: http://www.cs.unr.edu/~jrb; Dept. of Computer Science, University of California at Davis, Davis, CA 95616, USA, rogaway@cs.ucdavis.edu, WWW home page: http://www.cs.ucdavis.edu/~rogaway, 17 pages.
EP16885306.7 , "Extended European Search Report", dated Dec. 7, 2018, 9 pages.
Halevi et al., "A Tweakable Enciphering Mode", Lecture Notes in Computer Science, vol. 2729, Advances in Cryptology—Crypto 2003. 23rd Annual International Cryptology Conference, Santa Barbara, CA, Aug. 17, 2003, pp. 482-499.
PCT/US2016/012880 , "International Preliminary Report on Patentability", dated Jul. 26, 2018, 6 pages.
Rogaway , "A Synopsis of Format-Preserving Encryption", Retrieved from Internet, URL:http://citeseerx.ist.psu.edu/viewdoc/download;jsessionid=E386B44A2530D5A50C01B39CD7338BF2?doi=10.1.1.299.769&rep=rep1 &type=pdf [Retrieved on Jun. 16, 2015], Mar. 27, 2010, pp. 1-18.
First Examination Report dated Aug. 24, 2020 for AU Application No. 2016386405, 8 pages.

* cited by examiner 6-digit substitution

| Line | Encryption | Decryption |
|---|---|---|
|  | input $P_1 \dots P_m$ | input $C_1 \dots C_m$ |
| 00 | $PPP_0 = 0$ | $CCC_0 = 0$ |
| 01 | for $i = 1$ to $m$ do | for $i = 1$ to $m$ do |
| 02 | $\quad PPP_i = E_i(P_i \boxplus PPP_{i-1})$ | $\quad CCC_i = D_i(C_i \boxplus CCC_{i-1})$ |
| 10 | $MC = E_m(PPP_m \boxplus T)$ | $MP = D_m(CCC_m \boxplus T)$ |
| 11 | $M = 2 \, (PPP_1 \boxminus MC)$ | $M' = 2 \, (CCC_1 \boxminus MP)$ |
| 12 | $MP = PPP_1 \boxplus M$ | $MC = CCC_1 \boxplus M'$ |
| 20 | $CCC_0 = 0$ | $PPP_0 = 0$ |
| 21 | $CCC_1 = MC \boxplus M$ | $PPP_1 = MP \boxplus M'$ |
| 22 | for $i = 2$ to $m - 1$ do | for $i = 2$ to $m - 1$ do |
| 23 | $\quad CCC_i = PPP_{m+1-i} \boxplus M$ | $\quad PPP_i = CCC_{m+1-i} \boxplus M'$ |
| 24 | $CCC_m = E_m(MP) \boxminus T$ | $PPP_m = D_m(MC) \boxminus T$ |
| 30 | for $i = 1$ to $m$ do | for $i = 1$ to $m$ do |
| 31 | $\quad C_i = E_i(CCC_i) \boxminus CCC_{i-1}$ | $\quad P_i = D_i(PPP_i) \boxminus PPP_{i-1}$ |
| 40 | return $C_1 \dots C_m$ | return $P_1 \dots P_m$ |

FIG. 4

| Code | Character |
|------|-----------|
| 00 | A |
| 01 | B |
| 02 | C |
| 03 | D |
| 04 | E |
| 05 | F |
| 06 | G |
| 07 | H |
| 08 | I |
| 09 | J |
| 10 | K |
| 11 | L |
| 12 | M |
| 13 | N |
| 14 | O |
| 15 | P |
| 16 | Q |
| 17 | R |
| 18 | S |
| 19 | T |
| 20 | U |
| 21 | V |
| 22 | W |
| 23 | X |
| 24 | Y |
| 25 | Z |

FIG. 8

FAST FORMAT-PRESERVING ENCRYPTION FOR VARIABLE LENGTH DATA

CROSS-REFERENCES TO RELATED APPLICATION

The present application is a continuation of International Patent Application No. PCT/US2016/012880, filed Jan. 11, 2016, the entire contents of which are herein incorporated by reference in its entirety for all purposes.

BACKGROUND

In some cases, applications need to perform specific types of encryption for specific purpose. For example, for some applications in order to be compliant with data standards or regulations, an encrypted ciphertext must have the same size and format as the original unencrypted plaintext. An encryption scheme where the encrypted output ciphertext is in the same format as the input plaintext can be referred to as format-preserving encryption.

Previous approaches to format-preserving encryption for plaintext inputs suffered from many problems including, but not limited to: requiring large databases, being overly CPU-intensive, not providing enough cryptographic security, or having limits on the size of the input text.

Embodiments of the invention are directed to addressing the above problems, and other problems, individually and collectively.

BRIEF SUMMARY

Embodiments provide apparatuses, methods, and systems pertaining to the implementation of format-preserving encryption. Various embodiments of format-preserving encryption (FPE) can satisfy additional criteria including: prefix preservation, consistency, irreversibility, one-to-one correspondence between plaintext and ciphertext, pseudo-randomness and checksum. Some embodiments can provide fast and secure FPE for plaintext of arbitrary length by using a polygraphic substitution cipher to map a plaintext block of digits to a ciphertext block of digits.

In exemplary embodiments, an input string can be divided into blocks (potentially of varying length). An arrangement of cryptographic pipelines can perform operations on different blocks, each pipeline providing an output block. The cryptographic pipelines can interact such that the output blocks are dependent on each other. Each pipeline can substitute a block of N digits of plaintext with another block of N digits, which is part of the ciphertext. The cipher may preserve certain prefixes of plaintext. The cipher can also use one or more cryptographic tweaks. As a result, any change in the plaintext, including the prefix, can cause an apparently random and unpredictable effect on the encrypted part of the ciphertext.

To encrypt plaintext, a cipher can skip any portion of the plaintext to be preserved, then beginning with the portion to be encrypted, break that portion of the plaintext into one or more blocks (substrings) of specified sizes. For a block P with length N, a substitution operation can be performed using a substitution table to provide an output block C. The substitution table corresponding to length N can include any operation that receives an input block of length N and provides an output block of length N. The cipher can find a row in the substation table that matches P and return a block C, which can be stored at the matching row in the substitution table. The cipher can also apply a mask function and/or a tweak function to C and/or P. Once all blocks are run through the cipher, any preserved prefix and resultant enciphered blocks can be combined to produce encrypted text (ciphertext). A similar process for decryption can be performed.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 2 is diagram showing an example portion of a substitution table according to embodiments of the present invention.

FIG. 4 is a diagram showing a process of encrypting and decrypting an input string using a modified native CBC mode algorithm according to embodiments of the present invention.

FIG. 8 is a table for encoding characters to numeric values according to embodiments of the present invention.

TERMS

Figure 1:
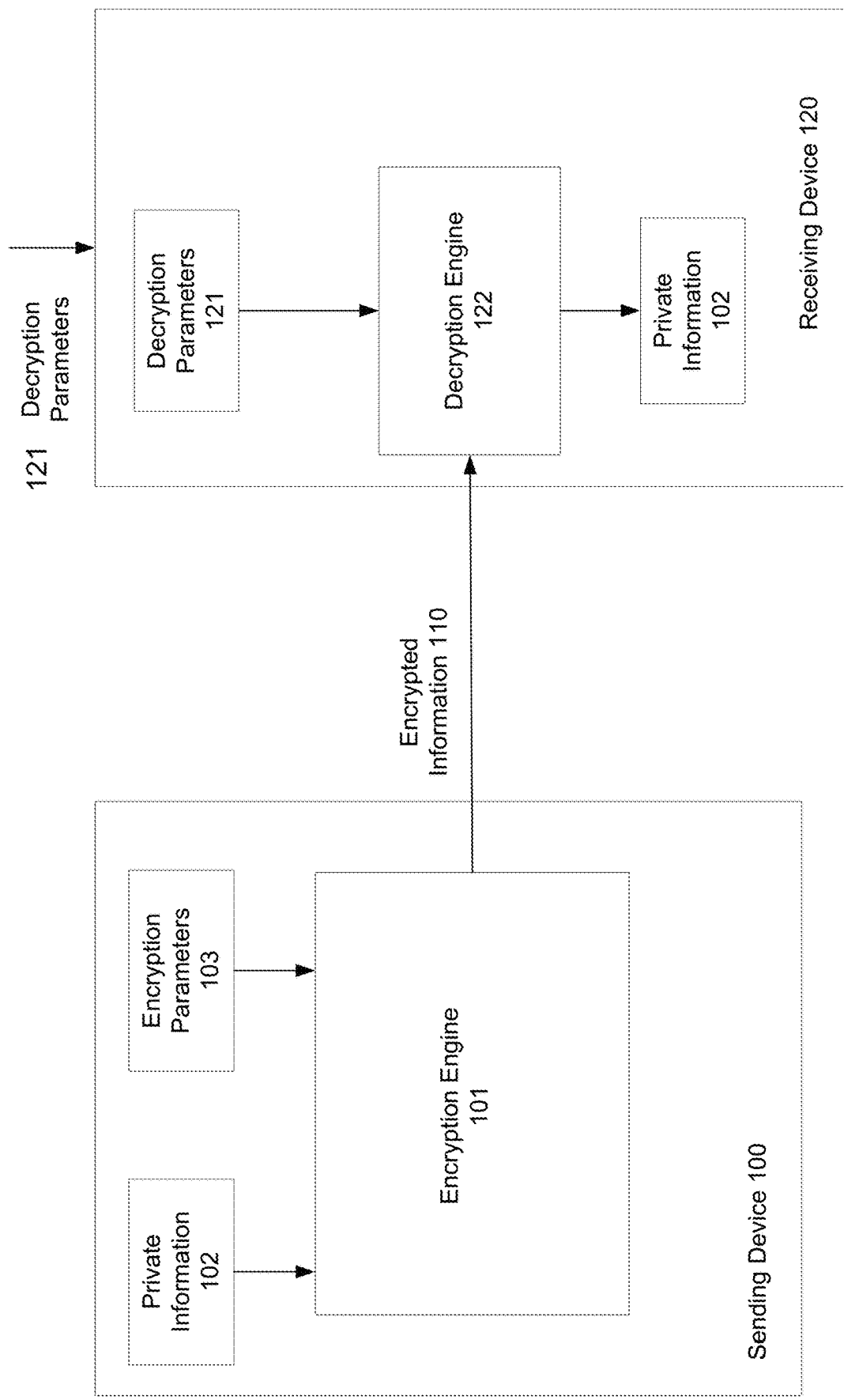
FIG. 1 is diagram showing typical environment for encrypting and decrypting data according to embodiments of the present invention.

A cipher may refer to a method for performing encryption or decryption. A cipher may include series of defined steps that operate on input data and provide output data, e.g., transforming non-encrypted data (plaintext) to encrypted data (ciphertext), or vice versa. A polygraphic substitution cipher can perform a substitution on multiple characters (also referred to a block) of the input data to provide multiple characters of output data. Format-preserving encryption (FPE) refers to performing encryption so that the format of the result of the encryption, the ciphertext, is in the same format as the input to the encryption, the plaintext.

A cryptographic checksum may refer to a mathematical value that is calculated on an encrypted data value and used to test the value to verify that the data has not been maliciously or accidentally changed. A cryptographic checksum can be created by performing a series of mathematical operations that translates the data into a hash value, which can then be used as a checksum. If the computed checksum for input data matches the stored value of a previously computed checksum, there is a very high probability the data has not been accidentally or maliciously altered or corrupted.

A block cipher may refer to a deterministic cryptographic algorithm that operates on fixed-length groups of bits, called blocks, with a transformation that is specified by a symmetric key, which may correspond to a substitution table. A symmetric-key encryption algorithm is one that uses the same cryptographic key(s) for both encryption of plaintext and decryption of ciphertext, e.g., the same substitution table(s). The keys may be identical or there may be a simple transformation between the two keys.

A substitution table may refer to a replacement structure for use with a cipher, wherein the substitution table provides a replacement value for an input value. For example, a substitution table may receive a 6-digit number as an input and return another 6-digit number. A substitution table may take an input value, look for the corresponding entry in the table, and return the value contained at that entry. There may be various substitution tables that take various size inputs and return various size outputs. A substitution table may be generated by a function, and thus the use of a substitution table may be performed by generating a full table and then accessing the table to determine an output block or by dynamically determining an output for a particular input.

Cipher block chaining (CBC) may refer to a mode of operation for a block cipher, in which a sequence of bits are encrypted as a single unit or block with a cipher key applied to the entire block. The decryption of a block of ciphertext can depend on one or more preceding ciphertext blocks.

A cryptographic tweak may refer to an additional input to a block cipher, along with the plaintext or ciphertext input. The tweak, along with the key, can select a permutation computed by the cipher. Some examples of values used in a tweak include a bank identification number (BIN) and an expiration date of a payment card. The use of a tweak can increase the complexity and time required to break an encryption scheme. A bank identification number or BIN is a numerical code assigned to each federally insured financial institution for the routing of transactions and other purposes.

Data scrubbing, also called data cleansing, may refer a process of amending or removing data in a database or other data storage mechanism that is incorrect, incomplete, improperly formatted, or duplicated.

DETAILED DESCRIPTION

Various embodiments provide systems, apparatuses, and methods for fast format-preserving encryption. The fast format-preserving encryption techniques may be used in a system to encrypt data on a sending device that is then sent to a receiving device, which can then use a format-preserving encryption method to decrypt and use the data that was encrypted by the sending device. Embodiments can operate on any size length of input data while still preserving the format, e.g., by breaking up the input data into blocks (potentially of different sizes) and performing block chaining operations such that each of the blocks are dependent on each other.

I. INTRODUCTION

A. Encryption/Decryption

Encryption is the process of converting ordinary information or plaintext into unintelligible text or ciphertext. Decryption is the reverse process, converting ciphertext back to plaintext. A cipher can consist of algorithms that implement the encryption and the reversing decryption. The detailed operation of a cipher can be controlled both by the algorithm and in each instance by one or more keys. Encryption can be needed in several modern contexts to protect data transferred between two devices, for example, two devices involved in a financial transaction.

FIG. 1 shows a typical environment for encrypting and decrypting information according to embodiments of the present invention. FIG. 1 is a system diagram showing a sending device 100 with an encryption engine 101 and a receiving device 120 with a decryption engine 122. Sending device 100 can use encryption engine 101 to encrypt private information 102 using encryption parameters 103, thereby producing encrypted information 110, which can be sent to receiving device 120.

Encryption engine 101 can receive private information 102 and encryption parameters 103. Private information 102 can include data to be encrypted and decrypted. Using private information 102 and encryption parameters 103, encryption engine 101 can produce encrypted information 110. Encryption parameters 103 can include substitution tables and other information necessary to perform the encryption of private information 102.

Encrypted information 110 can be sent from sending device 100 to receiving device 120. When encrypted information 110 is received at receiving device 120, receiving device 120 may decrypt encrypted information 110. Receiving device 120 can receive and store decryption parameters 121. Receiving device 120 can use decryption parameters 121 and decryption engine 122 to decrypt encrypted information 110 to produce private information 102. Decryption parameters 121 can include substitution tables and other information necessary to perform the decryption of encrypted information 110 to produce private information 102. Decryption engine 122 can thus reverse the process that encryption engine 101 performs.

B. Format Preserving Encryption

In cryptography, format-preserving encryption (FPE) refers to encrypting so that the output (ciphertext) is in the same format as the input (plaintext). It may be desirable to have ciphertext to have the same size and format as an original plaintext in various situations, including for use in payment systems. For example, sending device 100 can use such format-preserving encryption in its encryption engine 101 to create encrypted information 110, such as encrypted payment information. Sending device 100 can send that encrypted information 110 to a device, such as receiving device 120, which can use its decryption engine 122 to decrypt the payment information to further be able to carry out a transaction or perform other activities with the plaintext private information. If FPE is used, encrypted information 110 would have the same format as private information 102, e.g., a same number of characters.

Personally identifiable information (PII) may be considered to be any data that could potentially identify a specific individual. Any information that can be used to distinguish one person from another and that can be used for de-anonymizing anonymous data can be considered PII. The protection of PII can be aided by the means of encryption, particularly format-preserving encryption. For example, the Payment Card Industry (PCI) Data Security Standard requires protecting primary account numbers (PANs), which can be a form of PII. However, in using encryption to protect PANs, it is often desirable to maintain the same format of a PAN when the PAN is in both unencrypted plaintext and encrypted ciphertext forms.

The protection of PII data can be important in various domains in addition to payment systems. There are various requirements in many domains to protect PII data and many techniques for providing this protection. Many of these techniques require encryption of PII data by various means and sometimes it is required to treat encrypted PII data in such a way that the format of the PII data is preserved. For example, in the case of the protection of account numbers, it may be required to encrypt the account numbers in such a way that the format is preserved. When all cryptographic operations are offloaded to a centralized service, FPE can be performed as part of a tokenization process.

However, the current technology for format preserving encryption may suffer from many potential problems. An enciphering scheme using FPE for plaintext may need to meet several requirements. There can be several desired features of a format preserving encryption scheme, and several example requirements are described below.

A feature of a desired format preserving encryption system is that it should be able to encrypt a large number of digits, and not be limited to a small, fixed size of input characters to be encrypted. It is desired to be able to encrypt as many digits in an input string of as digits as desired. For example, a format preserving encryption system that only can encrypt 14 digits would not be generally sufficient for encryption of payment account numbers that are often 16 digits in length. For example, it would not be sufficient for the protection of debit cards or private label accounts and other accounts that are longer in length.

Another desired feature of a format preserving encryption system may be that even small changes to the an input plaintext will produce changes in resultant ciphertext. For example, a format preserving encryption system may take an input string (e.g., an input account number) and encrypt it to produce a first ciphertext. Following that, if any digit in the original input account number is modified, then the result of a subsequent encryption of the modified account number ideally should change totally and unpredictably from the first ciphertext. Accordingly, embodiments can employ elements of pseudo-randomness. The pseudo-randomness could provide that any change in the plaintext should cause an apparently random and unpredictable change in the encrypted part of the ciphertext, and similarly any change in the ciphertext can have an unpredictable effect on the decrypted plaintext.

Another potential requirement of the format preserving encryption system could be that the encryption should preserve a set number of digits. For example, the first six digits from the original text can be preserved in the encrypted text, but any changes to those first six digits will still result in changes in the ciphertext. In this example, the first six digits would be sent unencrypted as clear text. This could be useful for account numbers, where the first six digits can often correspond to an account range or BIN. The format preserving encryption system can preserve the first six digits, but everything else should ideally change when encrypted. Thus, even if any digit among the first six digits is changed, the results should change completely. The format preserving encryption system can allow for very secure encryption of unlimited blocks of data while preserving the format of the data.

For instance, the format of the text could need to be preserved when encrypted. For example, if the original plaintext has a requirement to contain only numeric digits and have a fixed length, then the encrypted ciphertext has to have the same number of digits as the original plaintext, and only contain numeric digits.

It may desirable that a format preserving encryption scheme have a checksum that is calculated. Further, the checksum could be required to be the same value. For example, it may be desirable to have the plaintext or ciphertext have a Luhn's checksum of zero. The checksum of the ciphertext could also depend on additional requirements, and thus its checksum may be zero or it may be a non-zero value. Any suitable checksum algorithm can be used.

The encryption scheme should produce consistent values, in that for a fixed secret key, the encryption scheme should produce the same ciphertext for the same original plaintext. Thus, different plaintext values should have different corresponding ciphertext. Consequently, the encryption scheme should have a one-to-one correspondence between plaintext and ciphertext. Ideally, the encryption scheme is irreversible in that it should be impossible to obtain the original plaintext from the ciphertext without a secret key.

Weak scrubbing methods for plaintexts may be vulnerable to a brute-force attack when the number of characters to be encrypted is relatively small. For example, with PANs there are a relatively small number of possible 16-digit PANs, making them potentially vulnerable to a brute force attack. Suppose that a cipher does not use any secret key. If the cipher preserves the first six digits and sets the last digit to meet checksum requirements, an attacker would only need to guess nine digits of the account to get the original PAN. To achieve this, an attacker can tokenize all billion possible PANs and then search the output for a match with the given token. On a fast computer, this process may take as little as a few minutes.

The use of a secret key does not always guarantee that a cipher is secure, though. For example, a person reading the encrypted data may know that it has to contain a certain plaintext, and may identify it. If the cipher is vulnerable to a known-plaintext attack, knowing both the original plaintext and the ciphertext makes it possible to derive the secret key.

When changes in a plaintext have a predictable effect on the ciphertext, an attacker may be able to get some information about the data. For example, suppose that a PAN is being encrypted and that the enciphering scheme does not depend on the BIN. Then, if the attacker sees two tokens whose only difference is in the BIN (along with the checksum digit), it suggests that the corresponding PANs are only different in the BIN.

Previous approaches to tokenization can require large databases, can be CPU-intensive, or can have limits on the size of the PAN. One solution is to store a random mapping of PANs to tokens in a centralized database. However, storing all possible 16-digit PANs that pass MOD 10 (Luhn's) check requires almost 10 PB of data storage. If the database stores only PANs in use, complex infrastructure is required to assure that the data is up to date and that all replicas of the data are in sync. If the stored object is a mapping of all 6- or 7-digit numbers to tokens of the same size, using it to tokenize real PANs, with nonstandard ones having as many as 28 digits, can be a significant challenge.

Another approach is to run a local FPE process that depends on a small (256-bit) encryption key. An example is a Cipher-based Message Authentication Code (CMAC) algorithm running in Format-preserving Feistel-based Encryption Mode (FFX) mode. This approach however requires multiple executions of a block cipher such as AES for each encryption. Therefore, it is much more CPU-intensive than ordinary non-format-preserving encryption.

To solve these problems, some embodiments can use multiple polygraphic substitutions that each substitutes a block (portion of the larger number) containing an N-digit number with another N-digit number. Different cryptographic pipelines can perform a polygraphic substitution for different input blocks, and the pipelines can be interrelated so as to have the output blocks dependent on each of the input blocks. Embodiments can use one or more substitution tables of various sizes, where the substitution tables contain mapping rules for all possible inputs of a certain size. For example, to encrypt the number P, the process includes finding the row number in the substitution table and returning the number at that row. The process can use the suitable tables which correspond the number of digits to encrypt.

Embodiments may also be used for data scrubbing, for example, in a test environment, which might have to deal with account numbers or other similar, sensitive test data. For example, a merchant may want to test an internal application and need account numbers, but does not want real account numbers. Embodiment could be used to generate encrypted test values for this purpose. Note that when used for copying data from production to non-production environments, embodiments can be used for data scrubbing.

II. USE OF SUBSTITUTION TABLES

A. Substitution Tables

In cryptography, a substitution cipher is a method of encoding plaintext data by which units of the plaintext are replaced with ciphertext, according to a fixed system. These units may be single characters, pairs of characters, three characters, and so forth. A recipient of the ciphertext can decipher the text by performing the inverse substitution. The substitution cipher can employ one or more substitution tables to perform the replacing of characters. A substitution table can take in an N-character input and return an M-character output. Often times N and M are the same number.

Format-preserving encryption can be performed by a polygraphic substitution cipher that substitutes one or more blocks containing an N-digit number with another N-digit number. Methods for format-preserving encryption may use one or more substitution tables corresponding to a size N, where a substitution table contains the mapping rules for all possible $10^N$ inputs (or other base number, e.g., 16 for hexadecimal numbers). The substitution tables can be computed and used by the system for performing the format preserving encryption. For example, if replacing one character for one character, the cipher can use the table for N=1, where there are mapping rules for mapping each digit 0-9 to another digit 0-9. Similarly, for replacing blocks of digits of length 4, a substitution table for size N=4 is employed. This table contains mapping rules for mapping each block of digits 0000-9999 to another block of digits 0000-9999.

FIG. 2 is an example of a six-digit substitution. A substitution table of size 6 can contain mappings such as shown in FIG. 2 to map all six-digit numbers to another six-digit number. For example, FIG. 2 shows 012937 mapped to 083733, 106189 mapped to 974688, and 974606 mapped to 537986. FIG. 2 comprises a small example sample of the data stored in a six-digit substitution table.

The generation of the substitution table can consist of multiple ($10^N$) random permutations in the list of all N-digit numbers. In the following examples, it is assumed that the largest table has N=6. For N=6, the process starts with the list of all numbers from 000000 to 999999. Then, for each row in the list, the process generates a random number j between 0 and 999999) using a secure random number generator, and exchanges the row i with the row j. Similarly, the process can be used to generate a 5-digit substitution table, a 4-digit table, etc. In practice, it may be necessary to have several tables for different N starting with N=1. Thus, a substitution table corresponding to size N contains $10^N$ randomly generated values from 0 to $10^N-1$, where input value from 0 to $10^N-1$, gives an output value from 0 to $10^N-1$.

Alternatively, a substitution table can be derived from an encryption key by means of a well-known block cipher, such as AES. In this case, instead of using a random number generator, the process can exchange the values at rows i and j, where j is the result of the encryption of i with AES, modulo $10^N$. Using such an encryption key is an example of how some embodiments can generate a plurality of entries of at least one of the one or more substitution tables. Thus, the substitution table does not need to be stored and can be generated dynamically. Moreover, the entire substitution table does not need to be generated, as some implementations can calculate the result of the substitution from the input value. Other examples of the dynamic generation of the substitution table and the calculation of the substitution result include Prefix Cipher, Cycle-Walking Cipher and Generalized Feistel Cipher (J. Black and P. Rogaway, "Ciphers with Arbitrary Finite Domains," Topics in Cryptology—CT-RSA 2002, Volume 2271 of the series Lecture Notes in Computer Science pp 114-130, 8 Feb. 2002).

Method for performing format preserving encryption can possibly use multiple substitution tables of different sizes. For example, if it is needed to encrypt only 14 digits, and the block size is 6, then two block of size 6 can use the 6-digit substitution table and the remaining two digits by using a smaller (N–2) substitution table. The use of a 2-digit substitution table does not undermine the security of the entire scheme, even though the number of possible encrypted values is small, as embodiments can have the end result dependent on all blocks. Embodiments can have a maximum size substitution table defined, and the plaintext can be broken down into chunks of the maximum size or smaller using the appropriate substitution table or tables.

B. Cipher-Block-Chaining Mode Diagram

Figure 3:
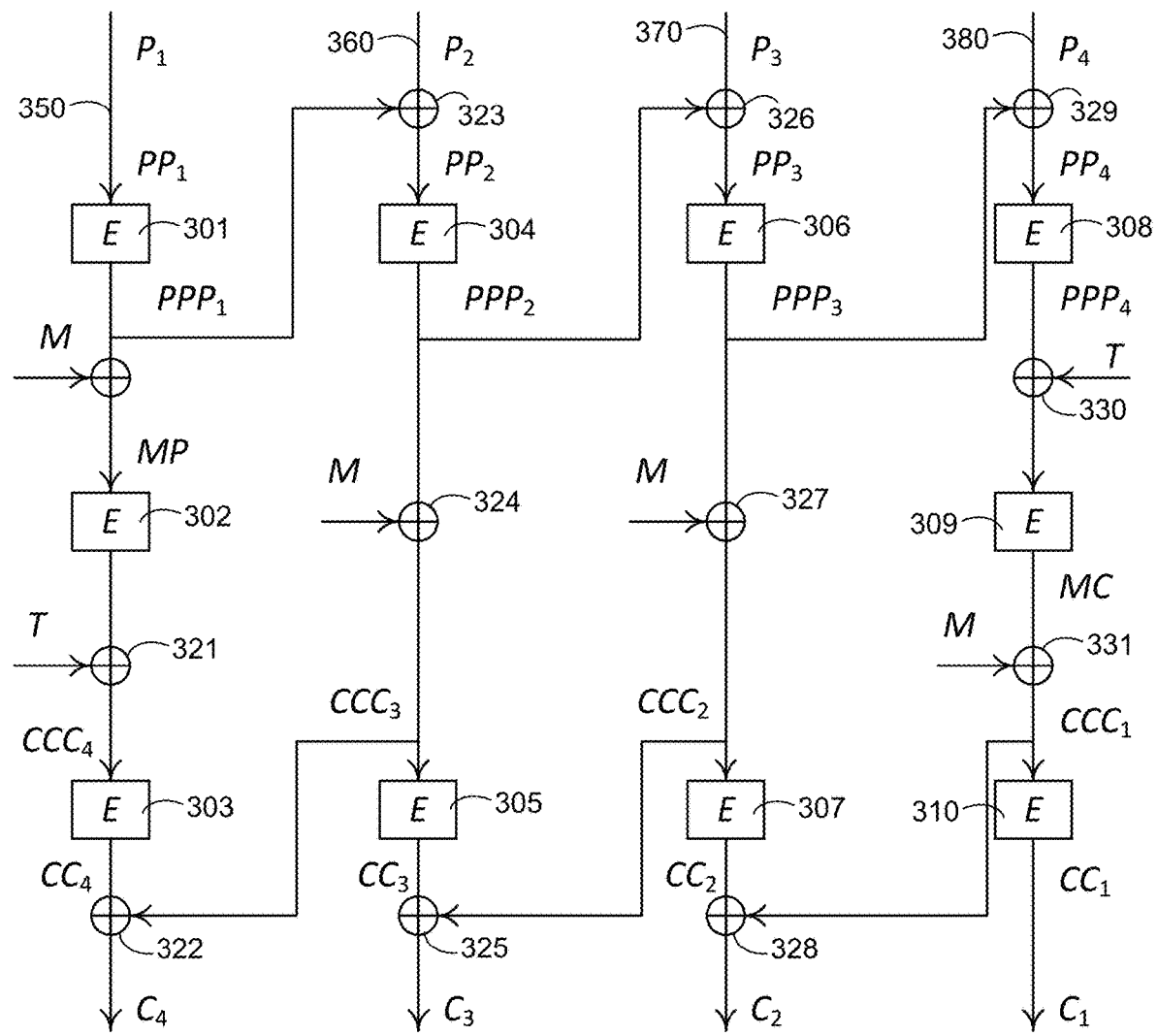
FIG. 3 is a diagram showing an implementation of cipher block chaining (CBC) using a mask (CMC) encryption mode according to embodiments of the present invention.

FIG. 3 is a diagram showing an implementation of cipher block chaining using a mask (CMC) encryption mode. FIG. 3 shows the example of the plaintext consisting of four blocks. In FIG. 3, there are several pipelines 350, 360, 370, and 380, which may run to perform the encryption or decryption. Some parts of the pipelines can run in parallel, while other parts can require input from other pipelines.

FIG. 3 shows encryption or decryption using substitution tables 301-310. The substitution tables may be of various sizes corresponding to the length of the input to be encrypted or decrypted. The substitution tables may be used by an encryption or decryption engine, such as 101 or 122 as depicted in FIG. 1. The encryption or decryption engines also have the ability to perform character-wise addition and subtraction operations. Combination operations 320-331, depicted by a circled plus, can be used for various character-wise addition and subtraction operations or other operations, which combine two values to obtain a new value. Operations 320, 324, 327, and 331 can also be used to perform operations for masking. Operations 321 and 330 can also be used to perform operations for applying a tweak.

Embodiments using cipher-block-chaining may receive: an input string to be encrypted, a desired block size N, a number of prefix account digits to not encrypt, and a mask function. This information can then be used to perform the encryption. The mask may also be computed from one or more input values. The block size N would be smaller than the length of the input string. The digits from the input string that are supposed to remain intact would stay unencrypted as cleartext, and the rest (referred to as P) of the input string would be encrypted as ciphertext. P can be the entire string if there are no characters that are to be unencrypted (cleartext).

P can be divided into a plurality of blocks $P_1, P_2 \ldots P_m$ (m is 4 in this example), so that a block $P_1$ has up to N digits and all remaining blocks have exactly N digits. $P_1$ may be any block of characters from the input string, not necessarily sequential characters to be encrypted from the input string. As part of encrypting block (substring) $P_i$, the block $P_i$ can be found in an entry in a substitution table, such as one of 301-310, and return an output block C stored at the corresponding entry in the substitution table. The substitution tables can all be of the same size, different sizes, or some can be the same and others can be different size.

If N was 6 and if the number of characters to be encrypted is larger than six, embodiments can split the input string P into several blocks $P_1, P_2, \ldots, P_m$ (m is 4 in this example), so that a single block $P_i$ has up to six digits and all remaining blocks have exactly six digits. In other embodiments, the block can be divided up in other ways, e.g., of more than two different sizes. To assure pseudo-randomness of both encryption and decryption, the embodiments can have interaction between the pipelines, support blocks of varying length, and use various character-wise operations. FIG. 3 is now described in more detail. Various operations in FIG. 3 are optional, e.g., mask operations and tweak operations.

In pipeline 350, input block $P_1$ is used to obtain output block $PPP_1$ from substitution table 301. Output block $PPP_1$ is then fed into pipeline 360. Later in pipeline 350, a mask operation 320 with value M is applied to $PPP_1$ to produce MP, which is used in a substitution table 302. A tweak operation 321 is applied to the resultant value to produce $CCC_4$. $CCC_4$ is input to a substitution table 303 to produce $CC_4$, on which a combination operation 322 (e.g., a character-wise operation, such as addition or subtraction) is performed with an intermediate value from pipeline 360 to produce output value $C_4$. Similar operations in pipelines 360, 370, and 380 can be performed in a similar manner as in pipeline 350.

In pipeline 360, combination operation 323 is performed on input block $P_2$ and output block $PPP_1$ from pipeline 350 to produce $PP_2$. $PP_2$ is used in substitution table 304 to produce $PPP_2$, which is fed into pipeline 370. A mask operation 324 with value M (or other mask value) is applied to $PPP_2$ to produce $CCC_3$. $CCC_3$ is fed back into pipeline 350 for use in combination operation 322. $CCC_3$ is used with substitution table 305 to produce $CC_3$. A combination operation 325 is performed with an intermediate value from pipeline 370 and $CC_3$, to produce value $C_3$.

In pipeline 370, a combination operation 326 is performed on input block $P_3$ and value $PPP_2$ from pipeline 360 to produce $PP_3$. $PP_3$ is used with substitution table 306 to produce value $PPP_3$, which is fed into pipeline 380. A mask operation 327 with value M is applied to $PPP_3$ to produce $CCC_2$. $CCC_2$ is fed into pipeline 360 and used with substitution table 307 to produce $CC_2$. A combination operation 328 is performed with an intermediate value from pipeline 380 and $CC_2$ to produce value $C_2$.

In pipeline 380, a combination operation 329 is performed on input block $P_4$ and $PPP_3$ from pipeline 370 to produce $PP_4$. $PP_4$ is used with substitution table 308 to produce value $PPP_4$. A tweak operation 330 with value T is applied to $PPP_4$, the result of which is used in substitution table 309 to produce MC. A mask operation 331 with value M is applied to MC to produce $CCC_1$. $CCC_1$ is used with substitution table 310 to produce $CC_1$, which corresponds to value $C_1$. The resultant encrypted value for the input string is determined from $C_4$, $C_3$, $C_2$, and $C_1$. The input string P may be for example a PAN, and the result of the encryption process thus may be an encrypted PAN. Decryption can be performed by performing the operations in reverse.

C. Encryption and Decryption Pseudo Code

FIG. 4 shows pseudo code for performing the encryption and decryption processes described herein. The figure uses the operands ⊞ and ⊟ which correspond to combination operations like operations 320-331 in FIG. 3. Function E denotes the use of a substitution table for encrypting a plaintext block $P_i$. Function $D_i$ denotes the use of a substitution table for decrypting the ciphertext block $C_i$. Thus, $D_i$ is a reverse of $E_{m-i+1}$. Although one can use the same substitution table for $E_2$, $E_3$, $E_m$ (and the corresponding $D_{m-1}, D_{m-2}, \ldots, D_1$), it is possible to use different substitution tables for different encryption blocks, but with each decryption block corresponding to an encryption block. In this example, there are m blocks. The substitution tables can correspond to substitution tables 301-310 shown in FIG. 3.

In the following description, squared plus ⊞ and squared minus ⊟ operators may denote character-wise addition and subtraction modulo 10, respectively. For example, if $A=a_1a_2 \ldots a_M$, $B=b_1b_2 \ldots b_M$ and $C=C_1C_2 \ldots C_M$ are M-digit numbers, C=A ⊞ B means that $c_i=(a_i+b_i)$ mod 10 for i=1 . . . M, and similarly C=A ⊟ B means that $c_i=(a_i-b_i+10)$ mod 10. Another example can use C=(A+B) mod $10^M$ and C=(A−B) mod $10^M$, respectively. Other operators are possible, pointwise and non-pointwise. For example, multiplication operations can be performed based on the entire numbers.

Embodiments may also include a tweakable block cipher, in that it utilizes a tweak. The tweak may be an N-digit value, for example, derived from a BIN for embodiments involving a PAN. In the pseudocode, P is an N-digit plaintext, C is an N-digit ciphertext, and T is an N-digit "tweak" (e.g., derived from a BIN).

The pseudocode shows a loop of encryption or decryption operations on the plaintext or the ciphertext for each of the blocks. In some embodiments, the first block ($P_1$, $C_m$) may have a size other than N characters, while other blocks may be N characters. In line 02, the encryption or decryption operations can use the corresponding substitution table and need to keep only the last digits, e.g., previous values in a pipeline. Line 10 corresponds to tweak operation 330 and encryption using substitution table 309 to obtain the value MC. Line 11 corresponds to the computation of a mask value using $PPP_1$ from the first pipeline and the MC result from the mth pipeline. As shown, the mask function is determined as a point-wise subtraction followed by a multiplication of the result by a scaling factor (2 in this example). Such a multiplication can be pointwise or of the entire numbers. Line 12 corresponds to mask operation 320. Line 21 corresponds to mask operation 331. Lines 22 and 23 correspond to any mask functions on intermediate pipelines, e.g., mask operations 324 and 37. Line 24 corresponds to tweak operation 321. Lines 30 and 31 correspond to encryption operations using substitution tables 310, 307, 305, and 303 and combination operations 328, 325, and 322. Also in line 11, multiplication by two denotes character-wise addition with itself. A possible alternative, except when the first block has only one digit, is to multiply by 10, effectively shifting all digits to the left by one.

As an example, if the plaintext consists of $N_1$-digit number $P_1$ and $N_2$-digit number $P_2$, the ciphertext $C_1$ and $C_2$ will consist of $N_2$-digit number $C_1$ and $N_1$-digit number $C_2$. And, the encryption process would include three instances of a substitution operation with $N_1$-digit substitution table and three instances of a substitution operation with the $N_2$-digit table.

III. EXAMPLES

Examples of encryption processes using various pipelines and different numbers of input characters. Embodiments can operate in a block-cipher mode operation adapted to support blocks of varying length and to support character-wise operators.

A. Example 16-Digit Encryption with 6-Digit Tweak

Figure 5:
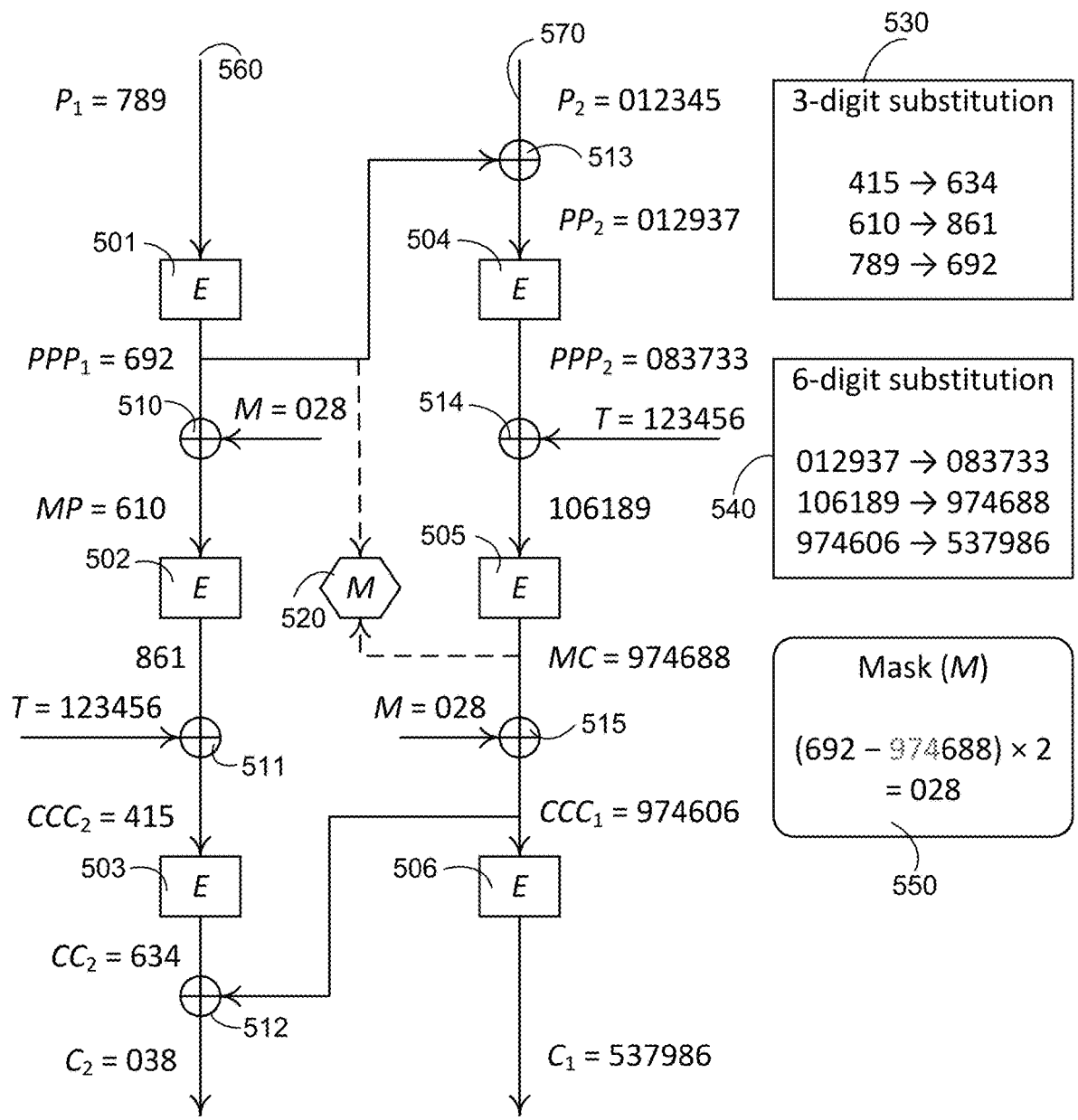
FIG. 5 is diagram of an example of encryption of a nine-digit number according to embodiments of the present invention.

FIG. 5 shows an example of the encryption of a 16-digit number with a 6-digit tweak, and a 6-digit block size. The input string is a 16-digit number 1234567890123452. The part that needs encryption is 789012345 and the result of its encryption is 537986038. The final result for the encrypted message including the cleartext and ciphertext (assuming that Luhn's checksum should be zero) is 1234565379860388, which can correspond to a token.

FIG. 5 includes two pipelines 560 and 570 and includes block encryption operations 501-506 using substitution tables (e.g., of various sizes), which may be used by an encryption or decryption engine, e.g., as depicted in FIG. 1. Portions of substitution tables are shown in 530 and 540, which depict 3-digit and 6-digit substitutions made in this example, respectively. Encryption or decryption engines can also have the ability to perform combination operations, such as character-wise addition and subtraction operations. Several combination operations 510-515 are represented in FIG. 5. The encryption or decryption engines also have the ability to perform masking operations. A masking operator is depicted by element 520. A masking operation for this example is shown as calculated in 550.

The last digit can be computed based on a checksum requirement. For example, the checksum of the encrypted account can be computed in a specific way so that the checksum will be one, while in the real account it will be zero. The checksum required value can be set to any value. The checksum can be an element of what makes encrypted numbers easily distinguishable from original plaintext values, without changing their format. The real plaintext numbers can have a certain checksum property such that the checksum must compute to a required value, for example, corresponding to certain valid, real account numbers. Thus, the checksum can provide an easy way to validate that there is a valid plaintext value. As examples, the checksum can take a value from 0 to 9 and therefore, if there are 15 digits, there is only one possible value of the 16 digits so that the entire checksum will be zero. The checksum may be non-zero explicitly if there is such a requirement, e.g., as mentioned above.

In this example, the tweak uses the characters that are not encrypted. These characters are left in plaintext form, but the tweak nevertheless has an impact on the ciphertext. For example, if there is a 16-digit number, the first 6 digits may be preserved in their original form and format. The result of the encryption can preserve the first six digits so that the output of encryption still has the same 6 digits. The remaining 9 digits of the 16 would then be encrypted. For example, embodiments can encrypt the digits 789 and 012345 based on a block size of six.

Pipeline 560 takes the first block, consisting of characters 789, and uses encryption operation 501 (corresponding to table 530) to find a substitution value. In this example, encryption operation 501 shows that 789 is substituted with 692, which is $PPP_1$.

Pipeline 560 also performs a mask operation. In mask operation 550, the computation of a mask value takes two input values (692 and 974688) and character-wise subtracts them from each other and multiplies the result by 2 to produce a mask of 028. In this example of a mask function, the input values are 692 and 974688, and the most significant digits are discarded in the longer number so that it will have the same number of digits as the shorter number. Thus, 692 ⊟ 688 is computed. Character-wise modulo 10 subtraction (6−6=0, 9−1=1, 2−8+10=4) gives 692 ⊟ 688=014. Now we character-wise multiply by 2 modulo 10 and get the value of the mask 028. A purpose of the mask can be to introduce an amount of randomness in the output under certain conditions. At character-wise addition 510, a mask is applied to 692 to obtain 610, the value of MP.

A 3-digit substitution is performed on MP using encryption operation 502 to obtain value 861. In this example, encryption operation 502 corresponds to table 530, but a different 3-digit table can be used. At tweak operation 511 (a character-wise subtraction in this example), a tweak value 123456 is applied to 861, to produce $CCC_2$=415. Encryption operation 503 uses the value of $CCC_2$ to produce 634, using table 530. At combination operation 512, $CCC_1$ from pipeline 570 is character-wise subtracted from the result of operation 503 to produce the value $C_2$=038.

In pipeline 570, the value of $PPP_1$, 692 is combined with $P_2$=012345 in a character-wise addition 513 to produce value 012937, which is used in encryption operation 504 (corresponding to 6-digit substitution table 540) to produce the value of $PPP_2$. Character-wise addition 513 (or other combination operation) can be performed before or after encryption operation 504, as can other combination operations in other pipelines. In some embodiments, a combination operation, such as 513, can be performed after encryption operation 504. Values such as $PPP_1$ and MP are examples of intermediate output blocks, and MC is an example of a new intermediate block.

$PPP_2$ can then be combined with a tweak operation 514 (a character-wise subtraction in this example), and the result of 106189 is obtained. At encryption operation 505 (also corresponding to substitution table 540), 106189 is used to produce MC=974688. At character-wise addition 515, the mask value 028 is applied to MC (value of 974688) to obtain $CCC_1$ with value of 974606. At encryption operation 506 (also corresponding to substitution table 540 in this example), the value of $CCC_1$ is used to produce the value of $C_1$=537986. Embodiments can combine 537986 with the result (038) of the encryption of the first pipeline to obtain the encrypted result, e.g., by also using the cleartext 123456 to compute checksum digit, which can be defined as part of the cipher method. Certain operations can be done in parallel, e.g., 510 and 515, and 502 and 506.

This system is reversible. Thus, if embodiments are applied to the encrypted number, the original number can be produced. A same method for encryption and decryption can be applied except the substitutions access the tables in opposite directions, i.e., from the left side or the right side. For example, the reverse operation would have 537986 used to obtain 974606. Otherwise, embodiments can be symmetric, including the computation of the mask. Additionally, embodiments can assure that when a tweak changes, it impacts all the blocks. And, if any change occurs in the second pipeline, then the output of the first pipeline will also change unpredictably. These unpredictable changes advantageously make decryption very difficult, while allowing efficient computational effort and storage to be used, as parallel operation with relatively small block sizes can be used.

One may be concerned that the use of a small substitution table used for the first pipeline may undermine the security of the large substitution table used for the rest of the blocks. For example, suppose that the process only encrypts two blocks (as in FIG. 5), there is no tweak and the mapping for the first block is just identity, which is equivalent to the case when the corresponding substitution table has been compromised. The larger block of the ciphertext can become $C1=E(2\ P1 \boxminus MC)$, where $MC=E(E(P1 \boxplus P2))$. The smaller block of the ciphertext can become $C2=P1 \boxminus MC$. If the smaller block had the same size as the larger block, then embodiments can have $C1=E(P1 \boxplus C2)$, which would expose the cipher E to a known-plaintext attack, provided that the attacker knows P1. But, the blocks have different size (and thus use a different substitution table) and $P1 \boxplus C2$ gives away only the least significant digits of the input to E, while the most significant digits, which come from MC, are still unknown. Thus, even with the smaller substitution table compromised, embodiments can remain secure.

B. Example 22-Digit Encryption

Figure 6:
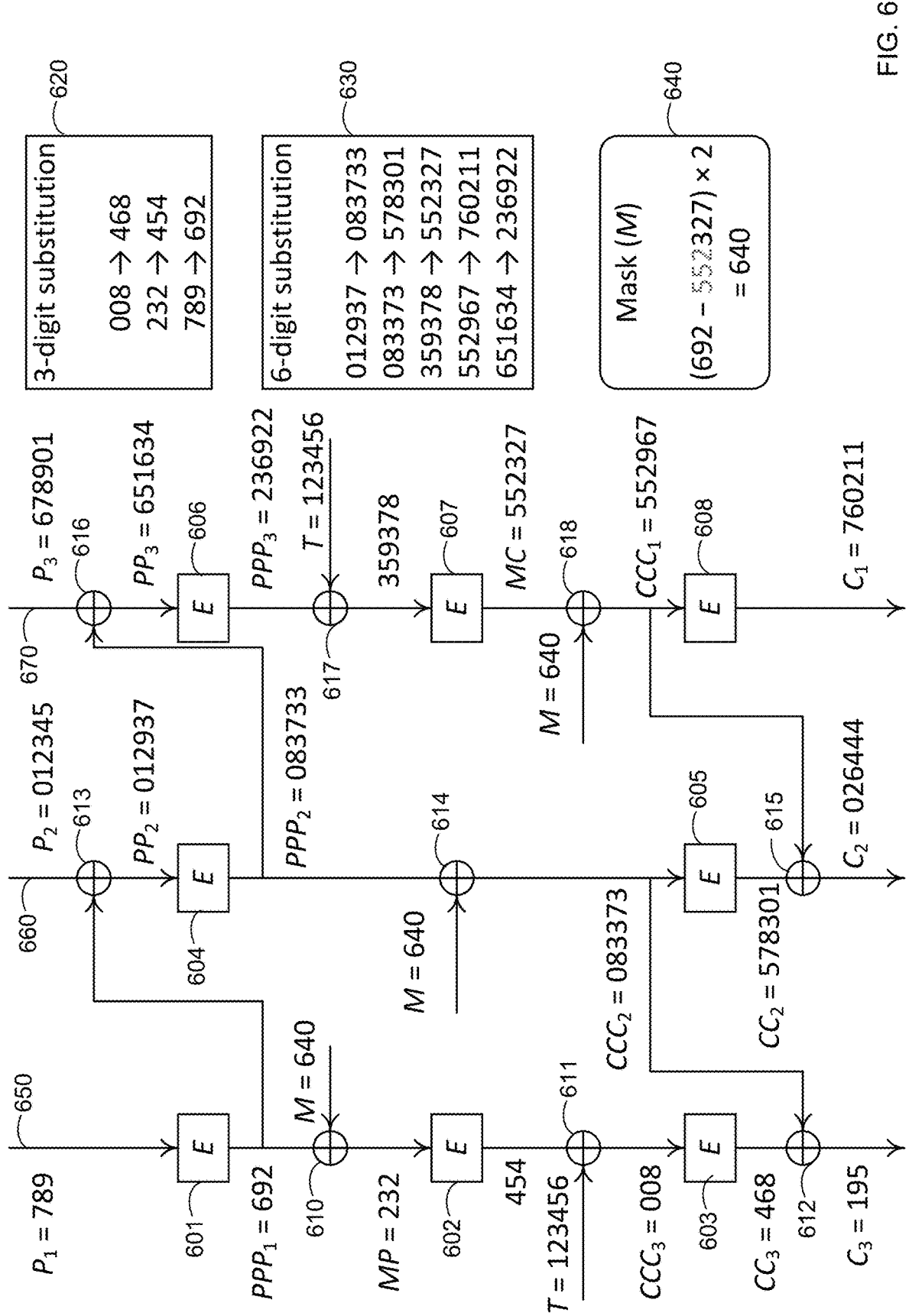
FIG. 6 is diagram of an example of encryption of a fifteen-digit number according to embodiments of the present invention.

FIG. 6 shows an example of encryption using three pipelines, where the input is a hypothetical 22-digit number 1234567890123456789012. The part that needs encryption is 789012345678901 and the output is 760211026444195. The value of the output is 1234567602110264441950.

FIG. 6 shows substitution tables that can used by an encryption or decryption engine, such as 101 or 122 of FIG. 1. FIG. 6 shows portions of substitution tables 620 and 630, which depict 3-digit and 6-digit substitutions, respectively. The encryption or decryption engines also have the ability to perform character-wise addition and subtraction operations, e.g., as depicted by 610-618. The encryption or decryption engines can also have the ability to perform masking operations. The result of calculating a mask for this example is shown as calculated in 640. In this example of a mask function, the input values are 692 and 552327, which results in 692 $\boxminus$ 327 being computed. Since 6–3=3, 9–2=7 and 2–7+10=5, we get 692 $\boxminus$ 327=375. Character-wise multiply by 2 modulo 10: 3×2=6, 7×2–10=4, 5×2–10=0. Thus, the mask is 640.

This example uses a 6 digit tweak of the first 6 digits that are preserved in their original form and format. The remaining 15 digits of the 22 can be encrypted. The example uses substitution tables of two sizes; one is 3-digit substitution and the other is 6-digit substitution. The method uses 3 pipelines, as there are 3 blocks of digits: 789, 012345, and 678901.

Pipeline 650 takes the first block, consisting of characters $P_1$=789, and uses encryption operation 601 (corresponding to substitution table 620) to find a substitution value $PPP_1$=692. In this example, the displayed portion of table 620 shows that 789 is replaced with 692. This value of 692 is combined with mask value M=640 in a character-wise addition by taking the remainder of division by 10. For example, 2+5 is 7 which is conventional. However when adding 6+6, the result is 12, but what remains is only 2 as the remainder of the division by 10. Then, the operation combines the next digit by making 9+4 to be 3, and finally 2+0 is 2, thereby providing MP=232. Thus, the process produces the value of MP=232, which when input to encryption operation 602 (also corresponding to substitution table 620) outputs 454.

Pipeline 650 continues with a tweak operation of 123456 applied at combination operation 611 to obtain 008. In this example, combination operation 611 is a character-wise subtraction that takes the last three digits from the tweak (456) and character-wise subtracts it from 454 modulo 10, which gives 008: 4–4=0, 5–5=0, 4–6+10=8. The value of 008 is used to access substitution table 630 in encryption operation 603 to obtain 468, which is subjected to character-wise subtraction 612 with $CCC_2$ to obtain the value of $C_3$=195.

At the top, pipeline 660 receives $PPP_1$=692 from pipeline 650 into character-wise addition 613 produce the value of 012937, which is used by encryption operation 604 (corresponding to 6-digit substitution table 630) to produce $PPP_2$=083733. $PPP_2$ is combined with mask value M=640 at character-wise addition 614 to produce $CCC_2$=083373. A 6-digit encryption operation 605 using substitution table 630 is used with $CCC_2$ to produce 578301, which is subjected to character-wise subtraction 615 with $CCC_1$=552967 from pipeline 670 to produce $C_2$=026444, as 578301'–'552967=026444 character-wise mod 10: 5–5=0; 7–5=2; 8–2=6; 3–9+10=4; 0–6+10=4; 1–7+10=4.

At the top, pipeline 670 receives $PPP_2$=083733 from pipeline 660, which is combined at operation 616 with $P_3$=678901 to produce 651634. The value 651634 is found in 6-digit substitution table 630 as part of encryption operation 606 to produce $PPP_3$=236922. $PPP_3$ is subjected to a tweak T=123456 to produce 359378, and encryption operation 607 (also corresponding to 6-digit substitution table 607 in this example) is used to obtain MC=552327. At combination operation 618, this value is character-wise added with mask M=640 to produce $CCC_1$=552967, which is fed back into pipeline 660. $CCC_1$=552967 is then used with 6-digit substitution table 630 in encryption operation 608 to produce a final value for this pipeline of $C_1$=760211.

In this example, the mask value can be computed via a mask function. The values of $PPP_1$ (692) and MC (552327) are character-wise subtracted from each other and multiplied by 2 to produce a mask of 640. The mask is applied to 692 to obtain 232 in pipeline 650, and is applied to 552327 in pipeline 670 to obtain 552967.

The three final values 195, 026444, and 760211 are combined with the cleartext prefix 123456 to compute a checksum digit to produce the final 22 digit, format-preserved, encrypted value. The checksum value can be specified by the cipher technique such that all of the other digits sum (various sums are possible) to the checksum digit. Luhn's checksum of all the digits is zero.

IV. FORMAT PRESERVING METHOD

As described above, embodiments can separate an input string into cleartext that is to be transmitted unencrypted and into plaintext characters to be encrypted. The plaintext can be divided into blocks (substrings). Each block can be processed by one of a plurality of pipelines, where the pipelines perform one or more encryption operations that involve substitution tables, e.g., predetermined or dynamically generated, which may be generated just for the blocks needed. The encrypted results for each pipeline can then be combined, including with the cleartext, to form a payload message for transmitting in an encrypted form. When the cryptographic operations are performed only through a centralized service, some embodiments can keep confidential as part of a tokenization process, where a different code replaces a private credential.

Figure 7A:
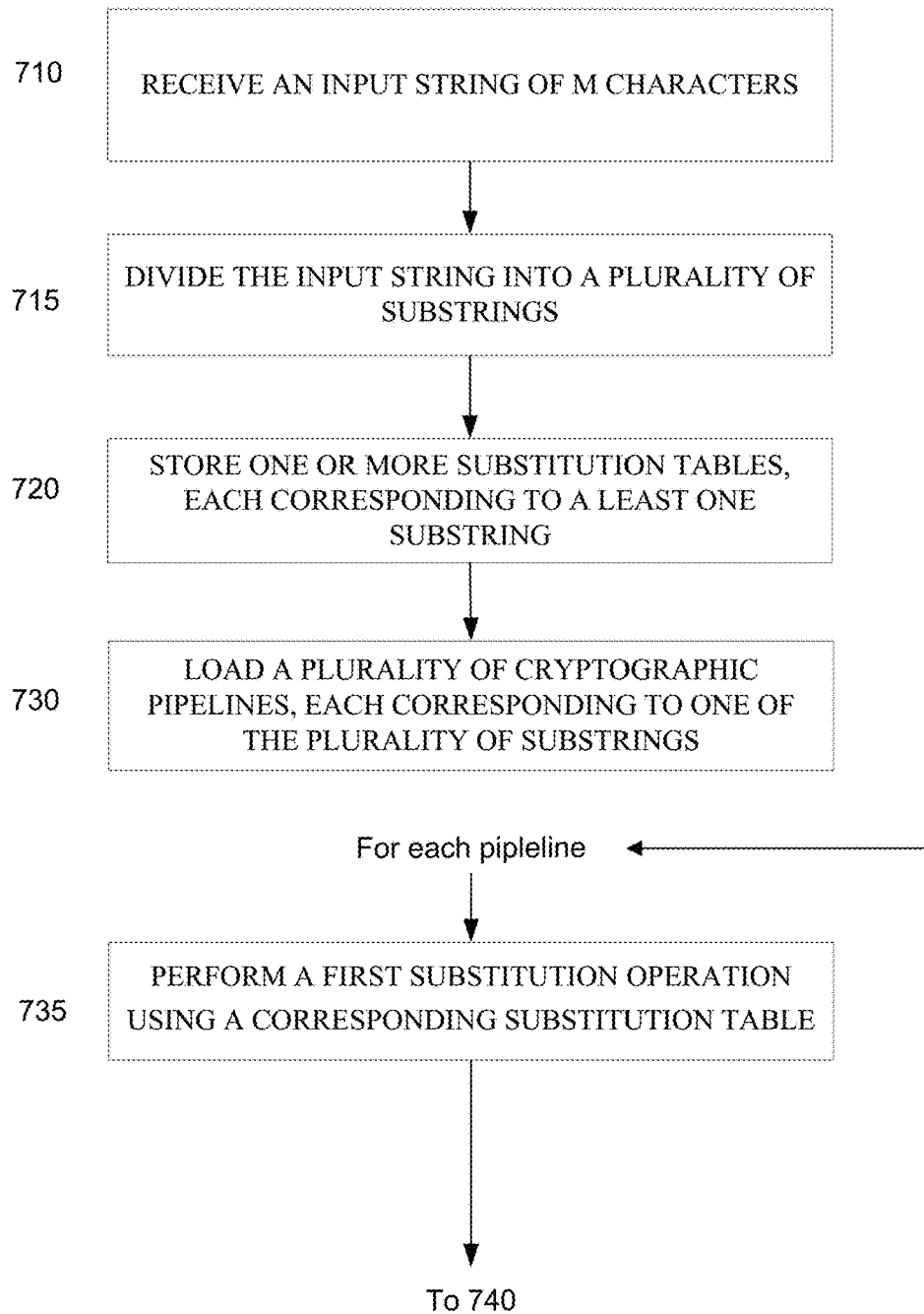
FIGS. 7A and 7B are a flowchart of method for performing a format-preserving cryptographic operation according to embodiments of the present invention.

FIGS. 7A and B is a flow diagram of a method 700 for performing a format-preserving cryptographic operation. Method 700 may be implemented by elements of a format preserving encryption system, e.g., in communication with a payment network, as seen in FIG. 1. Thus, method 700 can be performed by a computer system that implements an encryption or decryption engine.

At block 710, an input string of M characters is received. The input string can be to be encrypted or decrypted. The input string of M characters (plaintext) can be extracted from a larger input string of more than M characters. Other characters can be identified or specified to be sent in cleartext, e.g., a BIN part of a PAN. M can be an integer greater than 4. For example, encrypting a 5-character alphanumeric string would require a 300 MB substitution table, which would be impractical, and thus a benefit can be obtained by splitting the string into smaller blocks. In the numeric case, a minimum value might be 7.

At block 715, the input string is divided into a plurality of substrings. A substring may comprise any block of characters from the input string, i.e., not necessarily sequential characters. The input string can be divided in any suitable manner, as long as the manner is specified and known by the decryption engine. The substrings can be of different lengths.

As an example, if N divides evenly into M, in other words K=M modulo N=0, then the input string can be broken into blocks of size N, with N being an integer less than M. However, if K is greater than zero, then there will be one substring of length K, with the rest being of length N. Thus, a first substring of the plurality of substrings can have K characters and one or more other substrings can have N characters, where K equals M modulo N.

At block 720, one or more substitution tables are stored. Each of the one or more substitution tables correspond to a substring. For example, one table can correspond to a substring of K characters, and one other table can correspond to the rest of the substrings, which have a length of N characters. Thus, in some embodiments, a table can be re-used for multiple substrings, and even re-used for multiple encryption/decryption operations for a same substring, e.g., as shown in FIGS. 5 and 6. In other embodiments, a different table can be used for each encryption/decryption operation.

A substitution table can be used to provide an output block of a respective number of characters (e.g., N characters) based on an input block of the same respective number of characters, e.g., output 6 characters corresponding to an input of 6 character. Thus, if N is 6, then the substitution table providing an output block of 6 characters based on an input block of N characters can be obtained and stored in memory. In some embodiments, a substitution table can be stored as a deterministic rule for generating all or a portion of the table, e.g., a rule that provides the output block for any input block of the same number of characters.

The sizes of the one or more substitution tables are dependent on the lengths of the sub strings. If N is the largest size (width) of any substitution table, making the width of the substitution table N too small would undermine the security, while making the width too big would use too much memory and would slow down the process. In some embodiments, a total amount of input characters of the table $r^N$ should be greater than 100,000, or equivalently, $N > \log_r(100000)$, where r is the radix, which is the size of the alphabet. In the case of purely numeric input, r=10 and thus, N>5.

At block 730, a plurality of cryptographic pipelines are loaded. Each cryptographic pipeline corresponds to one of the plurality of substrings, e.g., as shown in FIGS. 3, 5, and 6. The plurality of cryptographic pipelines have an ordered arrangement such that they feed into each other. For example, a starting cryptographic pipeline has one forward neighboring pipeline, a final cryptographic pipeline has one reverse neighboring pipeline, and any other cryptographic pipelines can have two neighboring pipelines, e.g., as shown in FIGS. 3, 5, and 6.

Blocks 735 through 755 are performed for each of the plurality of cryptographic pipelines.

At block 735, a first substitution operation using a corresponding substitution table of a same size as the corresponding substring is performed to obtain a first output block based on a first input block that corresponds to the input string. Thus, if there is a substring of length six, then a 6-character substitution table corresponding to the substring is used to obtain a 6-character output block, e.g., as shown in FIGS. 3, 5, and 6, such as in encryption operation 501 and 601. In some embodiments, the first substitution operation can operate on the input substring for the pipeline or a result of a combination operation with the input substring, e.g., as done for combination operation 513 and encryption operation 504.

Figure 7B:
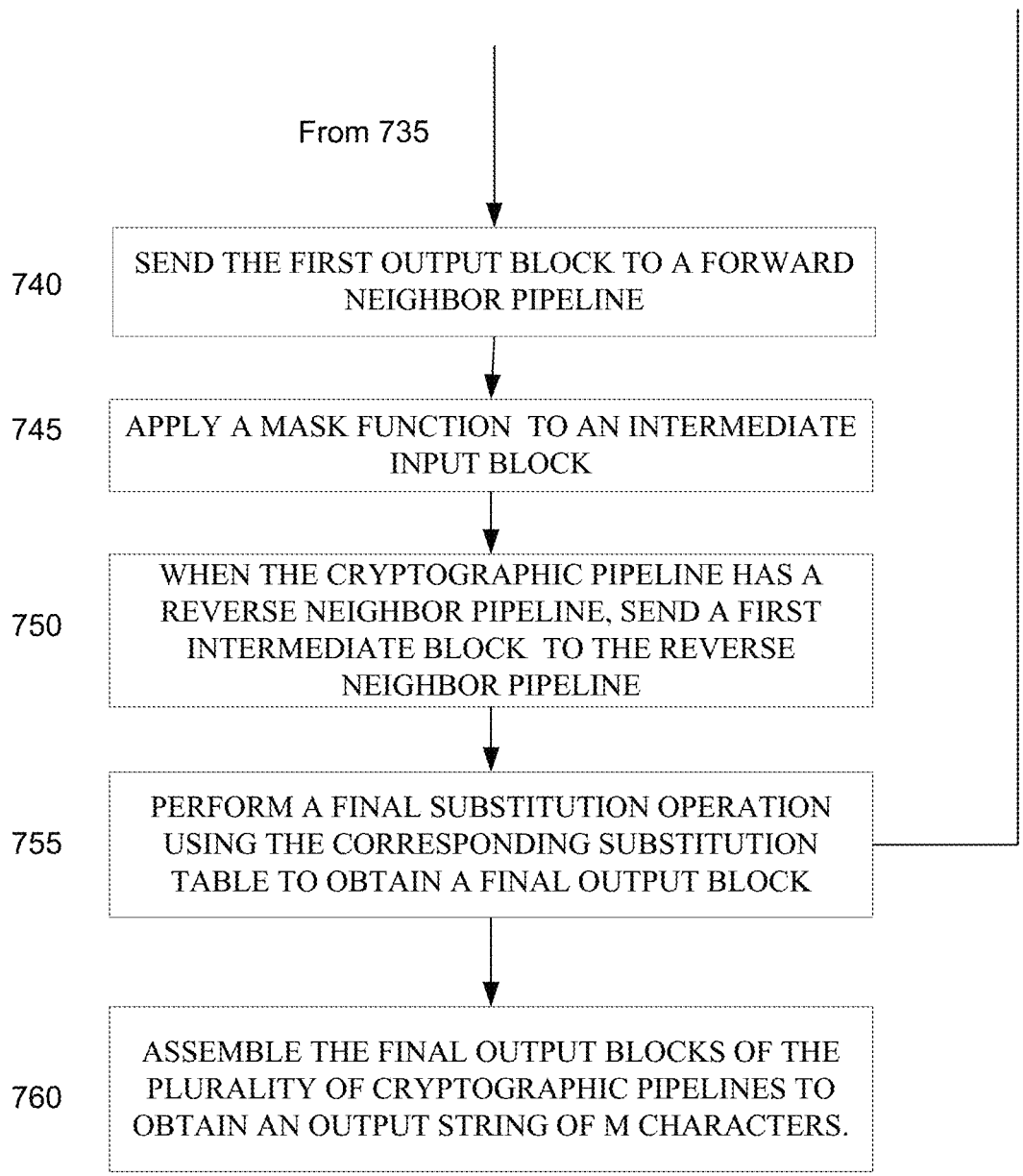

At block 740 (in FIG. 7B), the first output block is sent to a forward neighbor pipeline when the forward neighbor pipeline exists. The forward neighbor pipeline can use this first output block and a neighbor block corresponding to a neighbor substring in a first combination operation to obtain a neighbor input block to be used for a neighbor substitution operation. For example, PPP$_1$ in FIG. 5 is sent from pipeline 560 to pipeline 570.

In some embodiments, the forward neighbor pipeline can use the neighbor input block in a first neighbor substitution operation to obtain a neighbor output block for sending to a further neighbor pipeline when the further neighbor pipeline exists. For example, pipeline 660 can send PPP$_2$ to pipeline 670. The neighbor input block could be sent after a combination operation, e.g., combination operation 613 could be performed after encryption operation 604.

At block 745, a mask function is applied to an intermediate input block corresponding to the first output block to obtain an intermediate output block. As examples, the intermediate input block can be the first output block, the result of the first output block and a combination operation, or another encryption operation, e.g., in pipeline 670. The mask function can compute a mask value, and the mask value can be applied to the intermediate input block in a combination operation, e.g., operation 610. The mask function can be dependent on output blocks of at least two of the plurality of cryptographic pipelines. For example, mask operations 550 and 640 generate a mask value based on $PPP_1$ and MC. Dependence on a last block can be required for security, and dependence on the first block can provide symmetry for encryption/decryption.

At block 750, if the cryptographic pipeline has a reverse neighbor pipeline, a first intermediate block is sent to a reverse neighbor pipeline to use the first intermediate block with a neighbor intermediate block in a second combination operation. This first intermediate block can be the intermediate output block or derived from the intermediate output block. For example, $CCC_2$ is sent from pipelines 660 to pipeline 650, or $CCC_1$, which is derived from potential intermediate output block MC.

At block 755, a final substitution operation may be performed using the corresponding substitution table as part of obtaining a final output block based on the intermediate output block, where the final output block has a same size as the corresponding substring. The final output block can be obtained further based on the second combination operation when the forward neighbor pipeline exists. For example, encryption operations 603 (with combination operation 612), 605 (with combination operation 615), and 608 can provide the final output blocks $C_3$, $C_2$, and $C_1$.

At block 760, after all the substitutions are made for each pipeline, the final output blocks of the plurality of cryptographic pipelines are assembled to obtain an output string of M characters. When the cryptographic operation is encryption, the encrypted output string can be combined with any cleartext of the larger input string, e.g., a prefix that is kept intact, as is described for FIGS. 5 and 6.

A checksum digit can also be determined when the operation is encryption, as is described above. For example, a first sum can be calculated using the encrypted output string and potentially any cleartext. A checksum character is determined such that a checksum of the first sum and the checksum character provides an expected value (e.g. 0 or 1). The checksum character can be added to the encrypted output string to create a message for sending to another device such that the message has the correct checksum.

The input string of M characters can be part of a larger string, and a set of characters of the larger string that are not to be encrypted can be identified, e.g., a BIN or other values to be sent in cleartext. The set of characters and the encrypted output string of M characters can be combined to create a message of cleartext and ciphertext. The message can then be sent to another device.

In some embodiments, a tweak function can be applied to an intermediate block. The tweak function can be dependent on cleartext values of the input, i.e., characters that are not to be encrypted. The tweak function can apply the cleartext to one or more intermediate block in a combination operation. In this manner, if one changes the cleartext part of the input, this would also change the encrypted part of the message. If there was no cleartext, then a tweak function would not be performed, e.g., a social security number or a phone number might be entirely encrypted.

V. METHOD FOR ENCRYPTION OF NON-NUMERIC DATA

In the methods described above so far, the data was primarily described for numeric plaintext (such as PAN, phone number, social security number, zip code, etc.). Similar methods can be applied for non-numeric PII data (such as cardholder last name or street address) as well. To do so, an encoding table can be constructed.

In an encoding table, each of r characters that can possibly appear in the plaintext corresponds to a numeric code. As a result, the result of the format-preserving encryption can appear as a string of random characters from the same character set. For example, suppose that it is desired to encrypt a cardholder's last name that uses only uppercase Latin alphabet. This alphabet has r=26 characters (A-Z), and each character can correspond to a numeric value.

FIG. 8 shows a sample encoding table for the Latin alphabet according to embodiments of the present invention. Various encoding tables can be constructed for other desired mappings to numeric values. In FIG. 8, character A maps to code 00, character B maps to code 01, character C maps to code 02, and so on, representing all characters in the Latin alphabet Each character in the plaintext can be replaced with the corresponding code according to the encoding table. In the example, "SMITH" becomes a sequence of code values {18, 12, 08, 19, 07}.

The radix (or base) can be changed from 10 to the number of characters in the alphabet r (in the considered case it is 26). In particular, the definitions of character-wise addition and subtraction modulo r can be defined as follows. If A=a1a2 . . . aN, B=b1b2 . . . bN and C=c1c2 . . . cN are N-character strings, C=A ⊞ B means that ci=(ai+bi) mod r for i=1 . . . N, and similarly C=A ⊟ B means that ci=(ai−bi+r) mod r. Another example can use: $\Sigma_i c_i r^{M-i} = (\Sigma_i a_i r^{M-i} + \Sigma_i b_i r^{M-i})$ mod $r^M$ and $\Sigma_i c_i r^{M-i} = (\Sigma_i a_i r^{M-i} - \Sigma_i b_i r^{M-i})$ mod $r^M$, respectively.

Likewise, the polygraphic substitution cipher E substitutes a block containing an N-character string with another N-character string. A substitution table can have the mapping rules for all possible $r^N$ inputs. In the case r=26, the largest table could have N=4 or 5. Since the rest of the method is described in terms of the cipher E, the reverse operation D, and operands ⊞ and ⊟, the methods described above apply with no further changes.

After the encryption, each code can be replaced with the corresponding character according to an encoding table, which could be the same one used previously or another encoding table. In the above example, the result of encryption of the word "SMITH" can be a 5-character string consisting entirely of uppercase Latin characters, perhaps "WRZMU." Similar encoding tables can be created for various languages.

VI. COMPUTER SYSTEM

Figure 9:
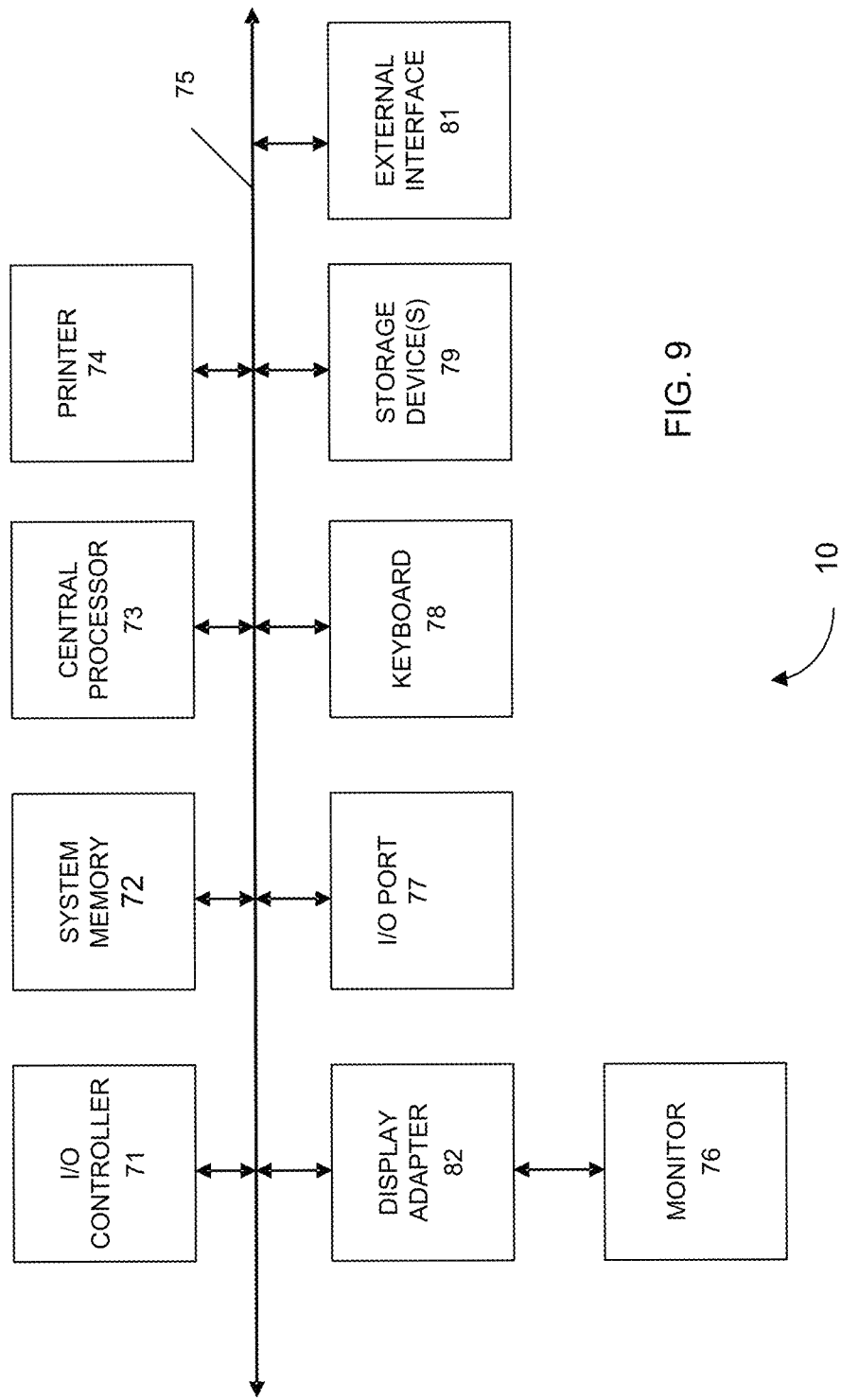
FIG. 9 shows a block diagram of an example computer system 10 usable with system and methods according to embodiments of the present invention.

Any of the computer systems mentioned herein may utilize any suitable number of subsystems. Examples of such subsystems are shown in FIG. 9 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®) For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for performing a format-preserving cryptographic operation, the method comprising performing, at a computer system:
   receiving an input string of M characters, M being an integer greater than 4;
   dividing the input string into a plurality of sub strings;
   storing one or more substitution tables, each of the one or more substitution tables corresponding to at least one substring of the plurality of substrings and providing an output block of a respective number of characters based on an input block of the same respective number of characters;
   loading a plurality of cryptographic pipelines, each corresponding to one substring of the plurality of sub strings, wherein the plurality of cryptographic pipelines have an ordered arrangement such that a starting cryptographic pipeline has one forward neighboring pipeline, a final cryptographic pipeline has one reverse neighboring pipeline, and any other cryptographic pipelines have a two neighboring pipelines;
   for each of the plurality of cryptographic pipelines:
      performing a first substitution operation using a corresponding substitution table of a same size as the corresponding substring to obtain a first output block based on a first input block that corresponds to the input string;

after the first substitution operation, sending the first output block to a forward neighbor pipeline when the forward neighbor pipeline exists for the forward neighbor pipeline to use the first output block and a neighbor block corresponding to a neighbor sub string in a first combination operation to obtain a neighbor input block to be used for a neighbor substitution operation;

applying a mask function to an intermediate input block corresponding to the first output block to obtain an intermediate output block, the mask function dependent on output blocks of at least two of the plurality of cryptographic pipelines;

when the cryptographic pipeline has a reverse neighbor pipeline, sending a first intermediate block to the reverse neighbor pipeline to use the first intermediate block with a neighbor intermediate block in a second combination operation, the first intermediate block being the intermediate output block or derived from the intermediate output block; and performing a final substitution operation using the corresponding substitution table as part of obtaining a final output block based on the intermediate output block, the final output block being obtained further based on the second combination operation when the forward neighbor pipeline exists, wherein the final output block has a same size as the corresponding substring;

assembling the final output blocks of the plurality of cryptographic pipelines to obtain an output string of M characters; and sending a message comprising at least the output string to another device.

2. The method of claim 1, wherein a first substring of the plurality of sub strings has K characters and one or more other sub strings have N characters, where K equals M modulo N, N being an integer less than M.

3. The method of claim 2, wherein storing one or more substitution tables includes;

storing a first substitution table, the first substitution table providing an output block of N characters based on an input block of N characters; and storing a second substitution table providing an output block of K characters based on an input block of K characters.

4. The method of claim 1, wherein the forward neighbor pipeline uses the neighbor input block in a first neighbor substitution operation to obtain a neighbor output block for sending to a further neighbor pipeline when the further neighbor pipeline exists.

5. The method of claim 1, further comprising performing, by the computer system:

generating at least one of the one or more substitution tables using a random number generator.

6. The method of claim 1, further comprising performing, by the computer system:

generating a plurality of entries of at least one of the one or more substitution tables using an encryption key.

7. The method of claim 1, wherein the cryptographic operation comprises encryption of the input string of M characters to obtain the encrypted output string of M characters.

8. The method of claim 7, further comprising performing, by the computer system:

calculating a first sum using the encrypted output string; and determining a checksum character such that a checksum of the first sum and the checksum character provides an expected value; and adding the checksum character to the encrypted output string to create the message for sending to another device.

9. The method of claim 7, wherein the input string of M characters is part of a larger string, the method further comprising performing, by the computer system:

identifying a set of characters of the larger string that are not to be encrypted;

combining the set of characters and the encrypted output string of M characters to create the message of cleartext and ciphertext; and sending the message to another device.

10. The method of claim 9, further comprising performing, by the computer system:

applying a tweak function to one or more intermediate output blocks of one or more of the plurality of cryptographic pipelines to generate one or more new intermediate blocks prior to performing the final substitution operation in the one or more cryptographic pipelines, wherein the tweak function is dependent on the set of characters that are not to be encrypted.

11. The method of claim 1, wherein the input string comprises non-numeric characters, the method further comprising performing, by the computer system:

using an encoding table to convert the non-numeric characters of the input string to numeric values.

12. The method of claim 1, wherein the input string of M characters is encrypted, and wherein the cryptographic operation comprises decrypting the input string to obtain the decrypted output string of M characters.

13. A computer system for performing a format-preserving cryptographic operation, the computer system comprising:

one or more processors; and a computer readable medium storing instructions for controlling the one or more processors to perform:

receiving an input string of M characters, M being an integer greater than 6;

dividing the input string into a plurality of sub strings;

storing one or more substitution tables, each of the one or more substitution tables corresponding to at least one substring and providing an output block of a respective number of characters based on an input block of the same respective number of characters;

loading a plurality of cryptographic pipelines, each corresponding to one of the plurality of sub strings, wherein the plurality of cryptographic pipelines have an ordered arrangement such that a starting cryptographic pipeline has one forward neighboring pipeline, a final cryptographic pipeline has one reverse neighboring pipeline, and any other cryptographic pipelines have a two neighboring pipelines;

for each of the plurality of cryptographic pipelines:

performing a first substitution operation using a corresponding substitution table of a same size as the corresponding substring to obtain a first output block based on a first input block that corresponds to the input string;

after the first substitution operation, sending the first output block to a forward neighbor pipeline when the forward neighbor pipeline exists for the forward neighbor pipeline to use the first output block and a neighbor block corresponding to a neighbor sub string in a first combination operation to obtain a neighbor input block to be used for a neighbor substitution operation;

applying a mask function to an intermediate input block corresponding to the first output block to obtain an intermediate output block, the mask function dependent on output blocks of at least two of the plurality of cryptographic pipelines;

when the cryptographic pipeline has a reverse neighbor pipeline, sending a first intermediate block to the reverse neighbor pipeline to use the first intermediate block with a neighbor intermediate block in a second combination operation, the first intermediate block being the intermediate output block or derived from the intermediate output block; and performing a final substitution operation using the corresponding substitution table as part of obtaining a final output block based on the intermediate output block, the final output block being obtained further based on the second combination operation when the forward neighbor pipeline exists, wherein the final output block has a same size as the corresponding substring; and assembling the final output blocks of the plurality of cryptographic pipelines to obtain an output string of M characters; and sending a message comprising at least the output string to another device.

14. The computer system of claim 13, wherein a first substring of the plurality of substrings has K characters and one or more other substrings have N characters, where K equals M modulo N, N being an integer less than M, and wherein storing one or more substitution tables includes;

storing a first substitution table, the first substitution table providing an output block of N characters based on an input block of N characters; and storing a second substitution table providing an output block of K characters based on an input block of K characters.

15. The computer system of claim 13, wherein the forward neighbor pipeline uses the neighbor input block in a first neighbor substitution operation to obtain a neighbor output block for sending to a further neighbor pipeline when the further neighbor pipeline exists.

16. The computer system of claim 13, wherein the one or more processors are further controlled to perform:

generating a plurality of entries of at least one of the one or more substitution tables using an encryption key.

17. The computer system of claim 13, wherein the cryptographic operation comprises encryption of the input string of M characters to obtain the encrypted output string of M characters.

18. The computer system of claim 17, wherein the one or more processors are further controlled to perform:

calculating a first sum using the encrypted output string; and determining a checksum character such that a checksum of the first sum and the checksum character provides an expected value; and adding the checksum character to the encrypted output string to create the message for sending to another device.

19. The computer system of claim 17, wherein the input string of M characters is part of a larger string, wherein the one or more processors are further controlled to perform:

identifying set of characters of the larger string that are not to be encrypted;

combining the set of characters and the encrypted output string of M characters to create the message of cleartext and ciphertext; and sending the message to another device.

20. The computer system of claim 19, wherein the one or more processors are further controlled to perform:

applying a tweak function to one or more intermediate output blocks of one or more of the plurality of cryptographic pipelines to generate one or more new intermediate blocks prior to performing the final substitution operation in the one or more cryptographic pipelines, wherein the tweak function is dependent on the set of characters that are not to be encrypted.

* * * * *

UNITED STATES PATENT AND TRADEMARK OFFICE
CERTIFICATE OF CORRECTION

PATENT NO. : 10,951,392 B2
APPLICATION NO. : 16/014516
DATED : March 16, 2021
INVENTOR(S) : Eugene Pivovarov It is certified that error appears in the above-identified patent and that said Letters Patent is hereby corrected as shown below:

In the Specification

In Column 16, Line 10, remove "lengths of the sub strings." and insert -- lengths of the substrings. --

In the Claims

In Column 20, Line 50, remove "a plurality of sub strings;" and insert -- a plurality of substrings; --

In Column 20, Line 58-59, remove "the plurality of sub strings," and insert -- the plurality of substrings, --

In Column 21, Line 8-9, remove "a neighbor sub string" and insert -- a neighbor substring --

In Column 21, Line 38, remove "plurality of sub strings" and insert -- plurality of substrings --

In Column 21, Line 42, remove "includes;" and insert -- includes: --

In Column 23, Line 34, remove "includes;" and insert -- includes: --

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*